(12) United States Patent
Berntsen et al.

(10) Patent No.: US 11,688,868 B2
(45) Date of Patent: Jun. 27, 2023

(54) FUEL CELL LOAD CYCLING TO SUPPORT THE ELECTRIC GRID

(71) Applicant: FuelCell Energy, Inc., Danbury, CT (US)

(72) Inventors: George P. Berntsen, Shelton, CT (US); Ramakrishnan Venkataraman, Danbury, CT (US); Mohammad Farooque, Marlboro, NJ (US)

(73) Assignee: FUEL CELL ENERGY, INC., Danbury, CT (US)

(*) Notice: Subject to any disclaimer, the term of this patent is extended or adjusted under 35 U.S.C. 154(b) by 193 days.

(21) Appl. No.: 16/307,204

(22) PCT Filed: Jun. 2, 2017

(86) PCT No.: PCT/US2017/035688
§ 371 (c)(1),
(2) Date: Dec. 5, 2018

(87) PCT Pub. No.: WO2017/213987
PCT Pub. Date: Dec. 14, 2017

(65) Prior Publication Data
US 2019/0267644 A1    Aug. 29, 2019

Related U.S. Application Data

(60) Provisional application No. 62/345,947, filed on Jun. 6, 2016.

(51) Int. Cl.
*H01M 8/04537* (2016.01)
*H01M 8/0438* (2016.01)
(Continued)

(52) U.S. Cl.
CPC ....... *H01M 8/04604* (2013.01); *B60L 3/0053* (2013.01); *B60L 50/72* (2019.02);
(Continued)

(58) Field of Classification Search
CPC ............ H01M 8/04298; H01M 8/043; H01M 8/04302; H01M 8/04303; H01M 8/04388;
(Continued)

(56) References Cited

U.S. PATENT DOCUMENTS 4,000,003 A   12/1976   Baker et al.
4,883,724 A   11/1989   Yamamoto
(Continued)

FOREIGN PATENT DOCUMENTS

EP    1 273 061        1/2003
JP    2005-295713 A    10/2005
(Continued)

OTHER PUBLICATIONS

International Search Report and Written Opinion in PCT/US2017/035688 dated Aug. 16, 2017 (8 pages).
(Continued)

*Primary Examiner* — Ryan S Cannon
(74) *Attorney, Agent, or Firm* — Foley & Lardner LLP (57) ABSTRACT

A fuel cell system includes a fuel cell unit configured to generate an amount of electrical power for supply to a varying electrical load and a fuel cell controller configured to receive a first indication that the varying electrical load is at a local maximum within a predetermined period, and, in response, operate the fuel cell unit with an operational parameter having a first value such that the fuel cell unit produces a limited maximum amount of electrical power that is a predetermined percentage of a maximum rated power output of the fuel cell unit. The fuel cell controller is also configured to receive an indication that the varying electrical load has reduced, and, in response, operate the fuel cell unit with the operational parameter having a second
(Continued)

value such that the fuel cell unit produces an amount of electrical power below the limited maximum amount of electrical power.

23 Claims, 6 Drawing Sheets

(51) Int. Cl.
*H01M 8/04858* (2016.01)
*H01M 8/14* (2006.01)
*B60L 3/00* (2019.01)
*B60L 50/72* (2019.01)

(52) U.S. Cl.
CPC ..... *H01M 8/0494* (2013.01); *H01M 8/04388* (2013.01); *H01M 8/04395* (2013.01); *H01M 8/145* (2013.01); *H01M 2008/147* (2013.01); *H01M 2250/10* (2013.01); *Y02B 90/10* (2013.01); *Y02E 60/50* (2013.01); *Y02T 90/40* (2013.01)

(58) Field of Classification Search
CPC ......... H01M 8/04395; H01M 8/04544–04626; H01M 8/04664–04679; H01M 8/04753; H01M 8/04761; H01M 8/04746; H01M 8/04955; H02J 2300/30
See application file for complete search history.

(56) References Cited

U.S. PATENT DOCUMENTS

| | | | |
|---|---|---|---|
| 4,988,283 A | 1/1991 | Nagasawa et al. | |
| 6,495,277 B1* | 12/2002 | Edlund | H01M 8/04626 429/411 |
| 2001/0049038 A1 | 12/2001 | Dickman et al. | |
| 2003/0111908 A1* | 6/2003 | Christensen | H02J 1/10 307/43 |
| 2003/0113601 A1* | 6/2003 | Edlund | H01M 8/04589 429/425 |
| 2004/0115487 A1* | 6/2004 | Ichinose | H01M 8/04947 429/432 |
| 2004/0219399 A1* | 11/2004 | Zhu | H01M 8/04955 429/468 |
| 2013/0175805 A1 | 7/2013 | Berntsen et al. | |
| 2014/0272625 A1* | 9/2014 | Berlowitz | H01M 8/04097 429/411 |
| 2015/0021992 A1* | 1/2015 | Toya | H01M 8/0494 307/25 |
| 2015/0030943 A1* | 1/2015 | Kobayashi | H01M 8/04022 429/410 |

FOREIGN PATENT DOCUMENTS

| | | |
|---|---|---|
| JP | 2009-189226 A | 8/2009 |
| WO | WO-01/73879 A1 | 10/2001 |

OTHER PUBLICATIONS

Extended European Search Report in EP17810759.5 dated Jan. 9, 2020 (7 pages).

* cited by examiner

FUEL CELL LOAD CYCLING TO SUPPORT THE ELECTRIC GRID

CROSS-REFERENCE TO RELATED PATENT APPLICATIONS

The present application is a U.S. national phase application under 35 U.S.C. § 371 of International Application No. PCT/US2017/035688, filed on Jun. 2, 2017, which claims the benefit of and priority to U.S. Provisional Patent Application No. 62/345,947, filed Jun. 6, 2016, the entire disclosures of which are incorporated herein by reference.

BACKGROUND

Embodiments described herein generally relate to systems and methods for fluctuating the output of a fuel cell system to account for changes in the load of the bulk electric system, and in particular to systems and methods for fluctuating the output of the fuel cell system without causing accelerated ageing of the fuel cells.

A fuel cell is a device which converts chemical energy, such as energy stored in a hydrocarbon fuel, into electrical energy by way of an electrochemical reaction. Generally, a fuel cell includes an anode electrode and a cathode electrode separated by an electrolyte that serves to conduct electrically charged ions. High temperature fuel cells, such as molten carbonate fuel cells and solid oxide fuel cells, operate by passing a reactant fuel gas through the anode electrode, while oxidant gas (e.g., carbon dioxide and oxygen) is passed through the cathode electrode. In order to produce a desired power level, a number of individual fuel cells can be stacked in series. In operation, a fuel cell system can provide electrical power to a load, such as an electrical grid. If such a load is unexpectedly removed from the fuel cell system (e.g., the electric grid goes down), such removal can cause a load cycle, and several of such load cycles can result in accelerated ageing of the fuel cell system due to changes in thermal-mechanical stresses.

SUMMARY

In one embodiment, a fuel cell system includes a fuel cell unit configured to generate an amount of electrical power for supply to a varying electrical load, the amount of electrical power varying as a function of an operational parameter of the fuel cell unit. The fuel cell system also includes a fuel cell controller communicatively coupled to the fuel cell unit. The fuel cell controller is configured to receive a first indication that the varying electrical load is at a local maximum within a predetermined period. In response to receiving the first indication, the fuel cell controller is configured to operate the fuel cell unit with the operational parameter having a first value such that the fuel cell unit produces a limited maximum amount of electrical power that is a predetermined percentage of a maximum rated power output of the fuel cell unit. The fuel cell controller is also configured to receive an indication that the varying electrical load has reduced from the local maximum. In response to receiving the indication that the varying electrical load has reduced from the local maximum, the fuel cell controller is also configured to operate the fuel cell unit with the operational parameter having a second value such that the fuel cell unit produces an amount of electrical power below the limited maximum amount of electrical power.

In one aspect of the fuel cell system, the predetermined percentage of the maximum rated power output is between approximately 50% and approximately 65%.

In one aspect of the fuel cell system, the predetermined percentage of the maximum rated power output is approximately 65%.

In one aspect of the fuel cell system, the fuel cell system further includes a load sensor configured to generate a signal based on electrical power demand level of the electrical load, and the first and second indications include signals generated by the load sensor.

In one aspect of the fuel cell system, the electrical load is an electrical grid.

In one aspect of the fuel cell system, the fuel cell system includes a plurality of fuel cell units configured to generate an amount of electrical power for supply to the varying electrical load, the amount of electrical power varying as a function of an operational parameter of the plurality of fuel cell units. The electrical output of each fuel cell unit of the plurality of fuel cell units is combined to supply electrical power to the varying electrical load. Each of the plurality of fuel cell units is capable of producing a power output at the maximum rated power output.

In one aspect of the fuel cell system, the fuel cell controller is configured to, in response to receiving the first indication, operate the plurality of fuel cell units with the operational parameter having a first set of values such that a subset of the plurality of fuel cell units produce limited maximum amounts of electrical power, the limited maximum amounts of electrical power being predetermined percentages of the maximum rated power output of the fuel cell unit.

In one aspect of the fuel cell system, the fuel cell controller is configured to, in response to receiving the indication that the varying electrical load has reduced from the local maximum, select a fuel cell unit of the subset of fuel cell units, and adjust the value of the operational parameter of the selected fuel cell unit over a predetermined period such that the power output of the selected fuel cell unit drops to a minimum value over a first predetermined period.

In one aspect of the fuel cell system, the minimum value is at most 40% of the maximum rated power output.

In one aspect of the fuel cell system, the first predetermined period is between approximately 1 and 3 hours.

In one aspect of the fuel cell system, the controller is further configured to receive a second indication that the varying electrical load is at the local maximum, and adjust the value of the operational parameter of the fuel cell unit over a predetermined period such that the power output of the selected fuel cell unit returns to the limited maximum value over a second predetermined period.

In one aspect of the fuel cell system, the fuel cell unit comprises a molten carbonate fuel cell including an anode configured to receive a reactant fuel originating from a fuel supply and a cathode configured to receive an oxidant gas, and wherein the operational parameter defines at least one of a flow rate of fuel from the fuel supply, or a flow rate of oxidant gas from the oxidizer.

In another embodiment, a fuel cell system includes a first plurality of fuel cell units configured to provide electrical power to a varying electrical load, the amount of electrical power varying as a function of an operational parameter of the first plurality of fuel cell units. The fuel cell system also includes a second plurality of fuel cell units configured to provide electrical power to the varying electrical load, the amount of electrical power varying as a function of an operational parameter of the second plurality of fuel cell units, wherein each fuel cell unit in the first plurality of fuel cell units and the second plurality of fuel cell units has a maximum rated power output. The fuel cell system also includes a fuel cell controller communicatively coupled to the first plurality of fuel cell units and the second plurality of fuel cell units. The fuel cell controller is configured to operate each fuel cell unit of the first plurality of fuel cell units with the operational parameter having a first value as a default such that each fuel cell unit in the first plurality of fuel cell units produces the maximum rated power output in a default operating condition. The fuel cell controller is also configured to receive an indication that the varying electrical load is at a local maximum within a predetermined period. In response to the indication that the varying electrical load is at the local maximum, the fuel cell controller is configured to operate each of the fuel cell units in the second plurality of fuel cell units with the operational parameter having values such that the second plurality of fuel cell units produce limited maximum amounts of electrical power that are predetermined percentages of the maximum rated power output. The fuel cell controller is also configured to receive a first indication that the varying electrical load has reduced from the local maximum. In response to receiving the first indication that the varying electrical load has reduced from the local maximum, the fuel cell controller is configured to adjust the operational parameter for a fuel cell unit in the second plurality of fuel cell units such that the fuel cell unit produces an amount of electrical power below the limited maximum amount of electrical power.

In one aspect of the fuel cell system, the predetermined percentages of the maximum rated power output are between approximately 50% and approximately 65%.

In one aspect of the fuel cell system, the fuel cell controller is further configured to, in response to receiving the indication that the varying electrical load is at the local maximum, operate each of the fuel cell units in the second plurality of fuel cell units with the operational parameter having an equivalent value such that each fuel cell unit of the second plurality of fuel cell units produces a power output at the same limited maximum value.

In one aspect of the fuel cell system, the fuel cell controller is configured to, in response to receiving the indication that the varying electrical load is at the local maximum, operate a first subset of the second plurality fuel cell units with the operational parameter having a second value such that each fuel cell unit in the first subset produces a power output at a first limited maximum value, and operate a second subset of the second plurality fuel cell units with the operational parameter having a third value such that each fuel cell unit in the second subset produces a power output at a second limited maximum value.

In one aspect of the fuel cell system, the fuel cell controller is further configured to, in response to receiving the first indication that the varying electrical load has reduced from the local maximum, operate the first subset with the operational parameter having a fourth value such that each fuel cell unit in the first subset produces a first minimum amount of electrical power, while maintaining operation of the second subset with the operational parameter having the second value.

In one aspect of the fuel cell system, the first minimum amount is at most 40% of the maximum rated power output.

In one aspect of the fuel cell system, the fuel cell controller is further configured to receive a second indication that the varying electrical load has reduced from the local maximum. In response to receiving the second indication, the fuel cell controller is configured to operate the second subset with the operational parameter having a fifth value such that each fuel cell unit in the second subset produces a second minimum amount of electrical power, while maintaining operation of the first subset with the operational parameter having the first value.

In one aspect of the fuel cell system, each fuel cell unit in the first and second plurality of fuel cell units comprises an anode configured to receive a reactant fuel originating from a fuel supply and a cathode configured to receive an oxidant gas from an oxidizer, wherein the operational parameter defines at least one of a flow rate of reactant fuel from the fuel supply or a flow rate of oxidant gas from the oxidizer.

DETAILED DESCRIPTION

Embodiments described herein generally relate to systems and methods for fluctuating the output of a fuel cell system to account for changes in the load of the bulk electric system, and in particular to systems and methods for fluctuating the output of the fuel cell system without causing accelerated ageing of the fuel cells.

The load of the bulk electric system (or electric grid) varies day to night and seasonally throughout the year. It is important that the bulk electric system's generation-to-load balance is maintained such that resources are not wasted and such that all customers are able to receive the power they need during peak periods. Traditional load following units (sometimes referred to as "peaker" units), such as gas turbine-generators, are deployed to follow the load of the bulk electric system and maintain the bulk system's generation-to-load balance. However, these traditional peaker units emit pollutants and have poor fuel efficiency which results in higher carbon emissions.

Figure 6:
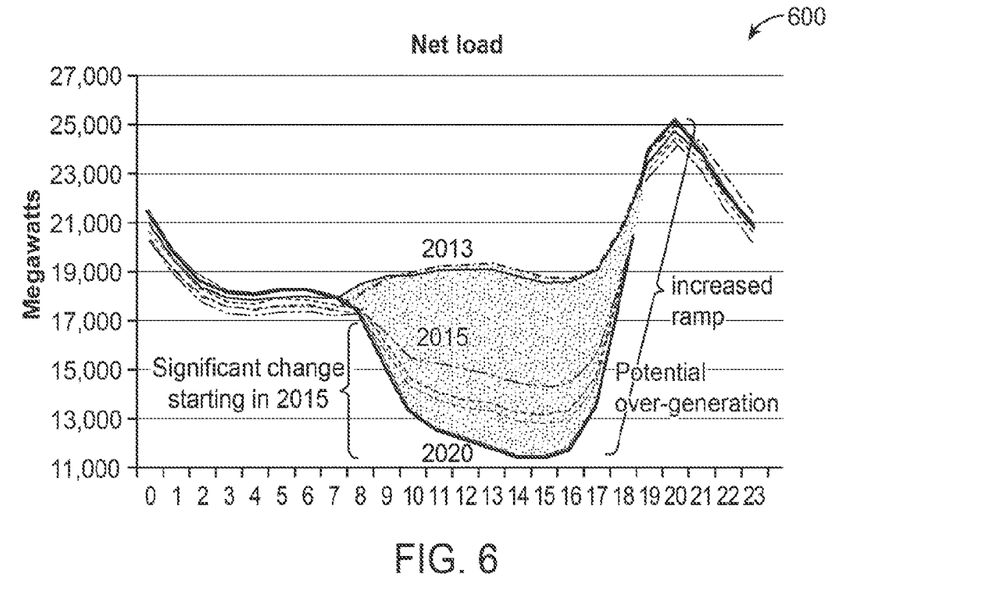
FIG. 6 is a diagram depicting a need for increased flexibility in systems that provide power to the electric grid in accordance with an illustrative embodiment.

As the penetration of intermittent renewable resources, such as solar and wind generators, increases, even more load following peaker resources are needed to maintain the bulk electric system generation-to-load balance. For example, California ISO has identified the growing need for power flexibility in the state due to these trends as shown in the chart 600 shown in FIG. 6. As depicted in FIG. 6, it is estimated that by 2020 there will be a daily fluctuation between the minimal and peak loads of approximately 14 gigawatts, which will require greater power flexibility than is currently available. The provision of such power flexibility is a compensated service which is growing in value.

In this regard and, in one implementation of the systems, methods, and apparatuses described herein, a molten carbonate fuel cell power plant is operated in grid parallel mode, and the fuel cells of the power plant are capable of cycling their output between a normal output and a minimum output, where the normal output is limited to a value determined by the thermo-neutral load point of the fuel cells. The normal output based on the thermo-neutral load point of the fuel cells may be between 50-65% of the maximum rated output of the fuel cells in one implementation. Specifically, by limiting the maximum power output of the molten carbonate, direct reforming fuel cell stacks to the thermal-neutral zone, which is between approximately 50-65% of total rated power, the output of the fuel cell plant can be cycled to 0% or another optimal reduced output and back once a day with no acceleration of the ageing of the stacks or impact on stack life. This capability can meet the worst case load ramping need identified by California ISO in FIG. 6, while avoiding the undesirable pollutants associated with traditional load following generation.

The fuel cells of the fuel cell power plant may be cycled on a daily basis from the normal output (i.e., ~50-65% of the maximum rated output) to a minimum output. The minimum output can optimally be 29% of the maximum rated output of the fuel cell. Alternatively, the minimum output of a fuel cell that is cycled may be 0%, 5%, 10%, 15%, 20%, 25%, 40% (of the maximum rated output), and/or any other value between 0 and the normal output. In one embodiment, the time that it takes for the fuel cell to cycle from its normal output to a zero output is approximately 3 hours, however, in alternative embodiments, a faster cycling time such as 1 hour may be used. In one embodiment, a fuel cell power plant can be configured to cycle daily between 28-65% of the maximum rating of the fuel cell power plant, without any impact on the ageing.

In one implementation, a multi-unit fuel cell power plant installation uses molten carbonate fuel cell power plants operating in grid parallel mode. Each individual fuel cell of the plant is capable of cycling its output between a normal output and no output on a daily basis. The normal output in this case is limited to a value determined by the thermo-neutral load point of the fuel cells, and is typically 50-65% of the maximum rated output. Depending on the overall system needs, only a portion of the fuel cell power plants in the multi-unit fuel cell power plant installation are operated in a load cycling mode, and the remaining fuel cell power plants are operated at maximum rated capacity. For example, if 60% of the fuel cell plants are configured to operate in a load cycling mode, the overall system will be able to achieve load cycling capability between 40% and 100% output for the installation. In alternative implementations, different percentages of the fuel cell may be operated in a load cycling mode, depending on the needs of the overall system.

Figure 1:
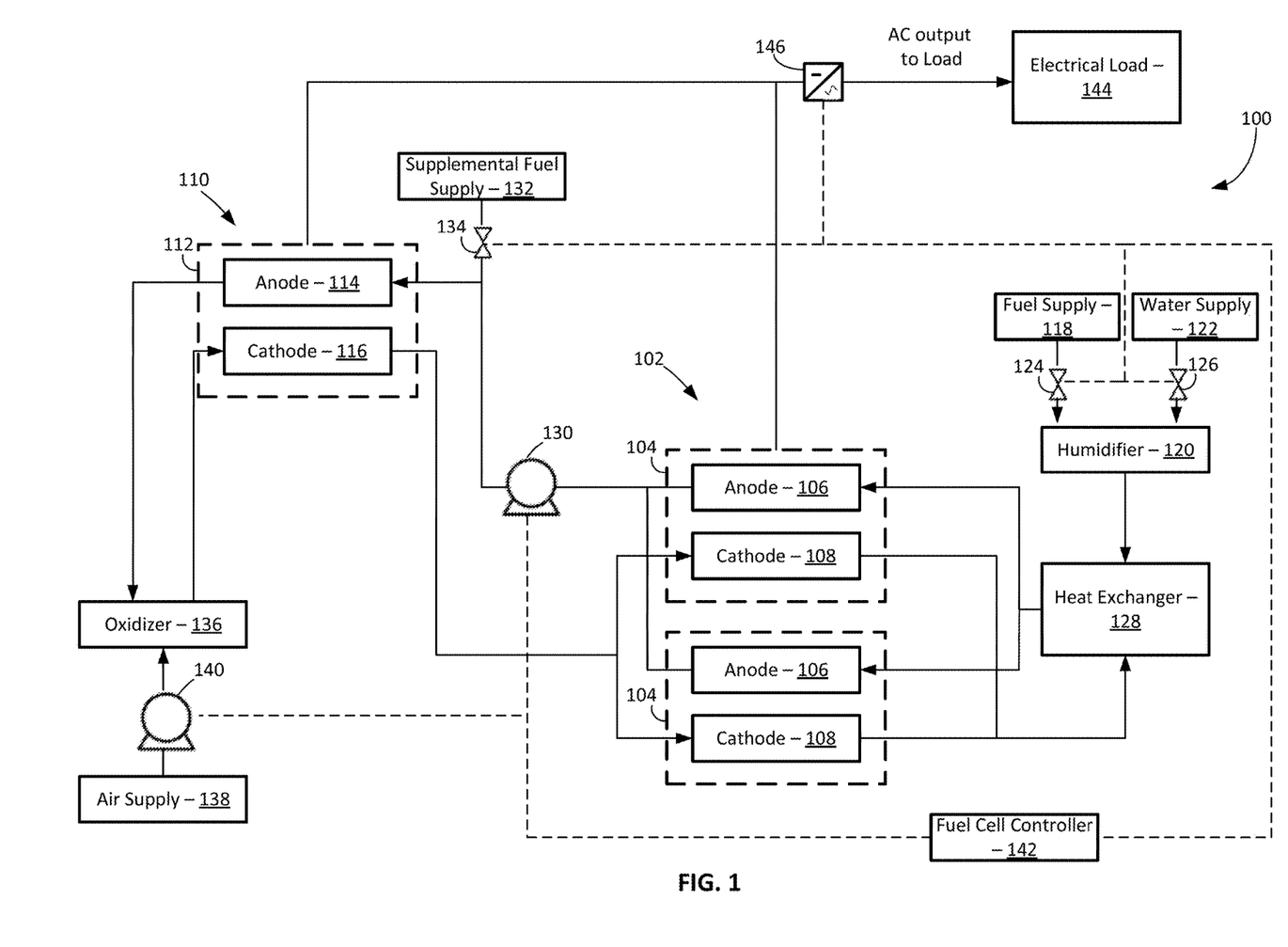
FIG. 1 is a schematic diagram for a load-following fuel cell unit, according to an example embodiment.

FIG. 1 schematically illustrates a load-following fuel cell unit 100, according to an example embodiment. As shown, the load-following fuel cell unit 100 includes a topping module 102, which contains one or more topping fuel cell stacks 104, and a bottoming module 110, which contains one or more bottoming fuel cell stacks 112. The topping module 102 and the bottoming module 110 are connected in series such that a first exhaust stream produced from an anode 106 of one of the topping fuel cell stacks 104 is provided to an anode 114 of a bottoming fuel cell stack 112. Additionally, as a result of the connection in series, a second stream produced from a cathode 116 of one of the bottoming fuel cell stacks 112 is provided to a cathode 108 of a topping fuel cell stack 104. In certain embodiments, the load-following fuel cell unit 100 is configured to operate in a similar manner as the system described in U.S. Pat. No. 9,478,819, which is incorporated herein by reference in its entirety. While the topping module 102 is show in FIG. 1 to include two topping fuel cell stacks 104 and the bottoming module 110 is shown to include a single bottoming fuel cell stack 112, it should be understood that topping and bottoming modules 102 and 110 may include different numbers of fuel cell stacks without departing from the scope of the present disclosure.

In various embodiments, the fuel cell stacks 104 and 112 of the topping and bottoming modules 102 and 110 may be internally reforming fuel cell stacks that include either direct internal reforming, indirect internal reforming, or a combination thereof. As such, in one embodiment, each of the fuel cell stacks 104 and 112 includes an internal reforming unit which modifies fuel (e.g., from a fuel supply 118 or supplemental fuel) and outputs reformed fuel including hydrogen and carbon monoxide to the anodes 106 and 114. Oxidant gas is supplied to the cathodes 108 and 116 via means described herein. Reformed fuel provided to the anodes 106 and 114 then undergoes an electro-chemical reaction with the oxidant gas to produce water, and an output of electrical power.

During operation of the load-following fuel cell unit 100, fuel (e.g., a hydrocarbon-based fuel such as natural gas, syngas, or renewable biogas) from a fuel supply 118 is introduced into a humidifier 120 via a connecting line. The humidifier 120 also receives water from a water supply 122 via an additional connecting line, and combines the fuel and the water to humidify the fuel for use by the topping module 102. In various embodiments, the rates at which fuel and water are supplied to the humidifier 120 are controlled via flow control devices, shown as valves 124 and 126 disposed within the connecting lines. As described herein, in some embodiments, the operational state of the valves 124 and 126 is controlled by a fuel cell controller 142 to change the electrical power output produced by the load-following fuel cell unit 100 based in part on a demand level received from an electrical load 144.

Humidified fuel then passes through a heat exchanger 128 for heating prior to introduction into the topping and bottoming modules 102 and 110, respectively. In some embodiments, prior to introduction into the heat exchanger 128, the humidified fuel is introduced into a pre-converter (not shown), where the fuel is partially reformed. Additionally, various other fuel processing steps (e.g., deoxidization, desulfurization) may be performed prior to introduction of the fuel into the topping module 102. Heated fuel is then introduced into the anodes 106 of the topping fuel cell stacks 104. At the same time, cathode exhaust outputted from cathodes 116 of the bottoming fuel cell stack 112 is fed into the cathodes 108 of the topping fuel cell stacks 104, causing the heated fuel to undergo an electro-chemical reaction to produce electrical power to be output to the electrical load 144 such as an electrical grid. Cathode exhaust outputted from the cathodes 108 is provided to the heat exchanger 128 to heat humidified fuel prior to introduction into the anodes 106.

In various embodiments, the anodes 106 of the topping fuel cell stacks 104 only consume a portion of the heated fuel received. As such, anode exhaust output from anodes 106 contains unconsumed fuel therein. This exhaust is received by a booster blower 130 disposed downstream of the topping fuel cell stacks 104 and upstream of the bottoming fuel cell stack 112. The booster blower 140 increases the pressure of the anode exhaust prior to the introduction of the anode exhaust into the bottoming fuel cell stack 112.

In some embodiments, anode exhaust supplied to the bottoming module 110 by the booster blower 130 is supplemented with fuel from a supplemental fuel supply 132. The supplemental fuel may be mixed with the anode exhaust without requiring any additional water to humidify the fuel since the anode exhaust streams from the topping module 102 includes adequate amounts of water. In some embodiments, the amount of supplemental fuel provided from the supplemental fuel supply 132 is controlled by a flow control device, shown as a valve 134. As described herein, in some embodiments, the operational state of the valve 134 is controlled by the fuel cell controller 142 to change the electrical power output produced by the load following fuel cell unit 100 based in part on a demand level received from the electrical load 144.

The combination of the anode exhaust produced by the topping module 102 and any supplemental fuel is then introduced into the anode 114 of the bottoming fuel cell stack 112. The input fuel may be reformed via direct internal reforming in the bottoming anode 114. Exhaust produced by the bottoming anode 114 is then provided to an oxidizer 136. The oxidizer 136 may include a mixer that mixes the anode exhaust with a first portion of preheated air received from an air supply 138 to produce an oxidant gas. The oxidant gas may be combined with a second portion of pre-heated air from the air supply 138 to produce an input oxidant gas for input to the bottoming cathode 116.

In some embodiments, the air supply 138 includes fresh air gathered by a booster blower 140 from the surroundings of the load-following fuel cell unit 100. The booster blower 140 pressurizes the air prior to the air's introduction into the oxidizer 136. In some embodiments, the output of the booster blower 140 is provided to an additional heat exchanger (not shown) that heats the air prior to the air's introduction to the oxidizer 136. In some embodiments, cathode exhaust output from the topping module 102 provides heat to the additional heat exchanger. As discussed above, a first portion of the pre-heated air is supplied to the oxidizer 136, and a second portion is routed around the oxidizer 136 and recombined with the first portion prior to introduction into the bottoming cathode 116. In some embodiments, the amount of air introduced into the oxidizer is controlled (e.g., via controlling flow control valves in supply lines) via the fuel cell controller 142 to control a level of power output by the load-following fuel cell unit 100 based on the demands of the electrical load 144.

Since the bottoming fuel cell stack 112 is supplied with both a fuel from the anode exhaust of the topping module 110 and an oxidizing gas from the oxidizer 136, an electrochemical reaction occurs in the bottoming module 110, producing an output of electrical power for supply to the electrical load. Cathode exhaust from the bottoming cathode 116 is conveyed to cathodes 108 of the topping fuel cell stacks 104. In some embodiments, a portion of the air from the air supply 138 bypasses the bottoming module 110 and is introduced as a supplemental oxidant into the cathodes 108 of the topping fuel cell stacks 104. A blower (not shown) may pressurize the supplement the supplemental oxidant prior to introduction into the cathodes 108. The amount of water introduced into the fuel cell stacks 104 may be controlled via the fuel cell controller 142 to control the level of power output by the load-following fuel cell unit 100.

The load following fuel cell unit 100 further includes an inverter 146 configured to convert the combined DC power outputs of the topping and bottoming modules 102 and 110 to an AC power output for supply to an electrical load 146. In various embodiments, the inverter 146 operates in accordance with a setpoint (e.g., provided by the fuel cell controller 142) that determines the portion of the DC power output produced by the topping and bottoming modules 102 and 112 that is converted and supplied to the electrical load 144. In some embodiments, the load following fuel cell unit 100 includes DC regulators (e.g., one DC regulator associated with each of the fuel cell stacks 104 and 112, not shown) configured to regulate the power output of each of the topping and bottoming modules 102 and 110.

Still referring to FIG. 1, the load-following fuel cell unit 100 includes a fuel cell controller 142 configured to control the operations of various components of the load-following fuel cell unit 100. In various embodiments, the fuel cell controller 142 is configured to control various operational parameters of the load-following fuel cell unit 100 including, but not limited to, an amount of fuel from the fuel supply 118 introduced into the topping module 102 (e.g., via control of the valve 124), an amount of water from the water supply 122 supplied to the humidifier 120 (e.g., via control of the valve 126), an input pressure of anode exhaust to the bottoming module 110 (e.g., via control of the booster blower 130), an amount of supplemental fuel provided to the bottoming module 110 (e.g., via control of the valve 134), the pressure of oxidant gas supplied to the bottoming module 110 (e.g., via control of the blower 140), an amount of supplemental air from the air supply 138 supplied to the topping module 102, the pressure of cathode exhaust from the bottoming module 110 introduced into the topping module 102 (e.g., via control of a cathode exhaust blower, not shown), the amount of air bypassed around a heat exchanger to control the temperature of the oxidant gas input to the bottoming module 110, and the setpoint of the inverter 146.

In various embodiments, the load-following fuel cell unit 100 is configured to operate in different energy modes, depending on the power generation needs of the electrical load 144. In some embodiments, the electrical load 144 includes a large scale power distribution system such as an electrical grid configured to provide electrical power to a number of different customers. Because the level of electricity demanded by each of the customers of the electrical grid may vary as a function of time (e.g., customers may demand more power during the evening than during midday), the amount of power required by the electrical load 144 vary depending on the time. It is important that the load-following fuel cell unit 100's generation-to-load balance is maintained such that resources are not wasted and such that all customers are able to receive the power they need during peak periods. Traditional load following units (sometimes referred to as "peaker" units), such as gas turbine-generators, are deployed to follow the load and maintain the bulk system's generation-to-load balance. However, these traditional peaker units emit pollutants and have poor fuel efficiency which results in higher carbon emissions.

Thus, it would be beneficially to adjust the operating parameters of the load-following fuel cell unit 100 to reduce the power output in times of reduced demand for electricity. In some embodiments, when operating at a peak rated capacity, the load-following fuel cell unit 100 is capable of producing a power output of 3.7 MW in manner that is capable of providing power for use by the electrical load 144. However, once the load-following fuel cell unit 100 operates to produce a power output of 3.7 MW, the lifetime of the load-following fuel cell unit 100 is adversely impacted by load cycling, which can be caused by a sudden reduction (or complete disappearance) of a load that is drawing power from the fuel cell system. Specifically, components load-following fuel cell unit 100 experience change in thermal-mechanical stresses and associated accelerated fuel cell stack ageing during such load cycling situations. A typical fuel cell can cycle its load down from rated load operation ~10% on a daily basis without suffering such ageing. A typical fuel cell can also cycle its load down ~20% every two weeks without suffering ageing. Exceeding these load cycling values will significantly accelerate the ageing of the fuel cell in most cases.

Accordingly, in accordance with the system and methods disclosed herein, during a time of peak power demand from the electrical load 144 (e.g., when the current demanded by the electrical load 144 is within a predetermined peak range), the fuel cell controller 142 is configured to operate the load-following fuel cell unit 100 within the thermal-neutral zone. In some embodiments, the load-following fuel cell unit 100 is operated at a reduced maximum output of approximately 2400 kW (i.e., at ~65% capacity). By doing this, the load-following fuel cell unit 100 could cycle power off or to some other optimal minimum power either immediately or over a 1-3 hour period without the negative aging effects discussed above. When needed, the plant's power output could ramp back up to 2400 kW over a 1-3 hour period. This load cycle could be accomplished once a day with no impact to the fuel cell stack life.

Specifically, by limiting the maximum power output of the molten carbonate, direct reforming fuel cell stacks (e.g., the fuel cell stacks 104 and 112 of the topping and bottoming modules 102 and 110, respectively) to the thermal-neutral zone, which is between approximately 50-65% of total rated power, the output of the fuel cell plant can be cycled to 0% or another optimal reduced output and back once a day with no acceleration of the ageing of the stacks or impact on stack life. As such, the output of the load-following fuel cell unit 100 can be adjusted by the fuel cell controller 142 in response to indications of reduced power demand levels of the electrical load 144. Such operations will be described in more detail below with respect to FIGS. 3-5

Figure 2:
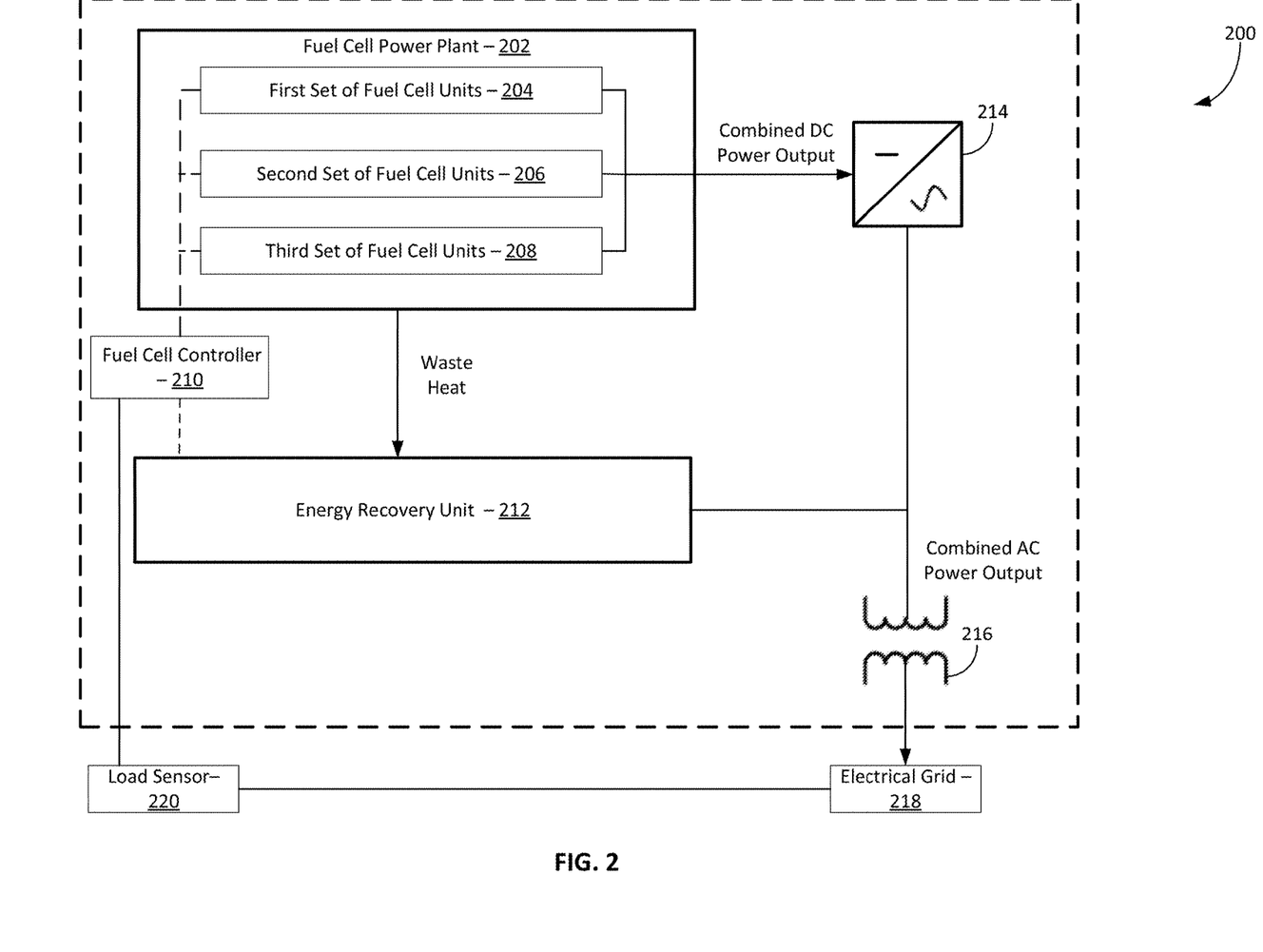
FIG. 2 is a schematic diagram for a power generation system including a load cycling fuel cell unit, according to an example embodiment.

Referring now to FIG. 2, a schematic diagram of a power generation system 200 is shown, according to an example embodiment. The power generation system 200 includes a fuel cell power plant 202 and a fuel cell controller 210. The fuel cell power plant 202 includes a number of sets of fuel cell units, shown as a first set of fuel cell units 204, a second set of fuel cell units 206, and a third set of fuel cell units 208. In an embodiment, each of the sets of fuel cell units 204, 206, and 208 includes a number of fuel cell units similar to the load-following fuel cell unit 100 discussed herein with respect to FIG. 1. In some embodiments, each fuel cell unit in the sets of fuel cell units 204, 206, and 208 may share certain elements of FIG. 1. For example, each of the fuel cell units may receive fuel from an aggregate fuel supply, and the fuel cell controller 142 may control the distribution of fuel to each of the fuel cell units in the sets of fuel cell units 204, 206, and 208. Additionally, each of the fuel cell units may also share an air supply, water supply, heat exchangers, oxidizers, or any other component external to the fuel cell stacks without departing from the scope of the present disclosure. In some embodiments, each fuel cell unit in the sets of fuel cell units 204, 206, and 208 may include an alternative configuration to that depicted in FIG. 1. For example, in one embodiment, each fuel cell unit in the sets of fuel cell units 204, 206, and 208 includes a simple cycle fuel cell.

In an embodiment, each of the electrical outputs of the fuel cell units are combined to provide a direct current (DC) power output to an inverter 214 that converts the DC current to an alternating current (AC) output. In some embodiments, each of the sets of fuel cell units 204, 206, and 208 includes a separate inverter and/or DC current regulator. The voltage of the AC output is then stepped up by a transformer 216 for mass distribution by an electrical grid 218. In some embodiments, the distributed power is a polyphase AC output. A load sensor 220 is configured to monitor characteristics of the power output. In some embodiments, the load sensor 220 includes a plurality of sensing units (e.g., one associated with each phase of the power output) and is configured to measure multiple aspects (e.g., voltage and current) of the power output for each phase. In some embodiments, the electrical grid 218 includes voltage regulators configured to maintain the output voltage at points of common coupling of the electrical grid 218 in response to changes in power demand of various customers. Accordingly, multiple load sensors 220 may measure the current at such points of common coupling and provide such data to the fuel cell controller 210 to facilitate the performance of the methods described herein.

Figure 7:
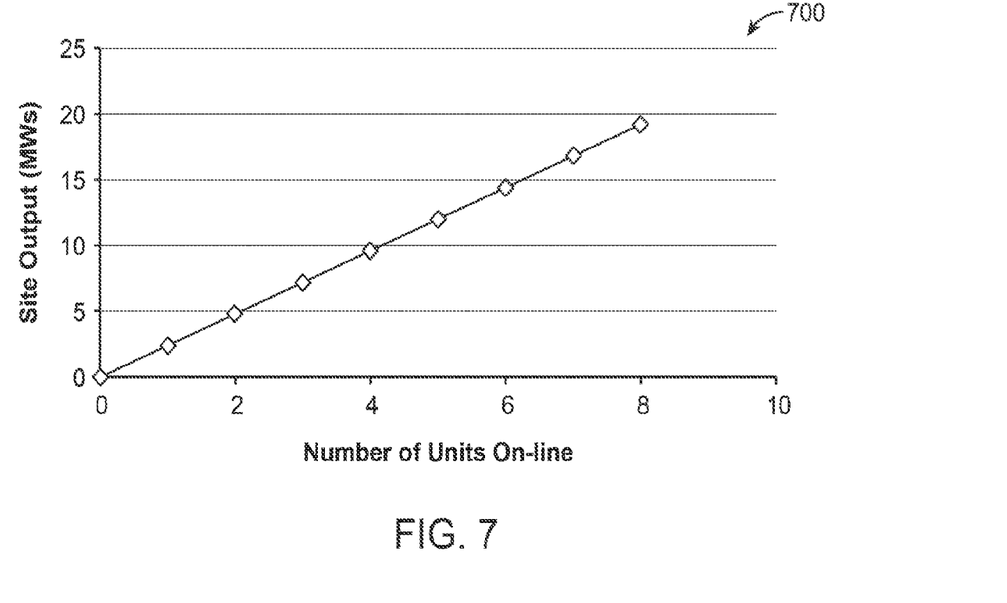
FIG. 7 is a diagram depicting the turn down capability of a multi-unit fuel cell system in accordance with an illustrative embodiment.

In one example embodiment, the sets of fuel cell units 204, 206, and 208 include a total of eight fuel cell units similar to the load-following fuel cell unit 100 discussed above. As such, when operated to generate a maximum-rated power output, the fuel cell power plant 202 may be capable of generating 29.6 MW of power. However, the fuel cell controller 210 may limit the maximum power output of each of the fuel cell units to a power output of the fuel cell stacks in the thermal neutral zone (e.g., at about 65% of the maximum-rated power output, or approximately 2.4 MW). As such, the aggregate site output (which is of concern to bulk electric system operators) can be adjusted by sequentially cycling individual fuel cell units as depicted in in the chart 700 shown in FIG. 7. Specifically, FIG. 7 is a diagram depicting the turn down capability of an 8 unit, 20 MW fuel cell power plant 202. This arrangement results in a site with full turndown capability while maintaining high fuel efficiency. Competing technologies, such as a single gas turbine-generator, have limited turndown ability (typically to 40% of rated output), and experience a significant decrease in efficiency at reduced load operation.

As depicted in FIG. 7, the system includes 8 fuel cell units, each of which is operating at a reduced maximum output as compared to its maximum rated output such that daily cycling of the units does not cause accelerated ageing. As also depicted, the output of the system can be controlled from 0 MW-20 MW to account for changing needs of the bulk electric system load. This flexibility of output is not possible with existing systems, which are typically operating at maximum ratings that would result in significant deterioration if such load cycling were implemented. In alternative implementations, different numbers of fuel cell units may be used and different total power outputs may be achieved.

In various embodiments, the power output of each fuel cell unit in the fuel cell power plant 202 may be reduced over a first predetermined period. In various embodiments, the fuel cell units of the fuel cell power plant 202 may be cycled on a daily basis from the limited maximum output (i.e., ~50-65% of the maximum rated output) to a minimum output. The minimum output can optimally be 29% of the maximum rated output of the fuel cell. Alternatively, the minimum output of a fuel cell that is cycled may be 0%, 5%, 10%, 15%, 20%, 25%, 40% (of the maximum rated output), and/or any other value between 0 and the limited maximum output. In one embodiment, the time that it takes for the fuel cell units to cycle from their limited maximum outputs to a zero output is approximately 3 hours, however, in alternative embodiments, a faster cycling time such as 1 hour may be used.

In various embodiments, the power output of the power generation system 200 is varied by a fuel cell controller 210. The fuel cell controller 210 is configured to provide control signals to the fuel cell power plant 202 and various other components of the power generation system 200 (e.g., the energy recovery unit 212). As such, the fuel cell controller 210 may generate a number of control signals configured to control various operational parameters (e.g., amount of fuel provided to various fuel cell stacks of the fuel cell units, the amount of oxidant gas supplied to various fuel cell stacks, humidification of fuel, a level of carbon dioxide provided in the oxidant gas, pressure differentials between anodes, etc.) of the fuel cell units to control their respective power outputs. A more detailed explanation of the fuel cell controller 210 is provided with respect to FIG. 3.

In an example, in response to receiving an indication that the electrical grid 218 demands an amount of power within a peak range (e.g., between 17,000 and 25,000 megawatts), the fuel cell controller 210 may provide control signals to each of the fuel cell units of the fuel cell power plant 202 to operate at a limited maximum output. However, in response to receiving another indication that the electrical grid 218 demands a diminished amount of electrical power (e.g., between 11,000 and 13,000 megawatts), the fuel cell controller 210 may adjust the operation parameters of a subset of the fuel cell units to reduce the power output to a set minimum output (e.g., 0%, 5%, 10%, 15%, 20%, 25%, 40% of the maximum-rated output) over a pre-determined period (e.g., 3 hours). In response to receiving another indication that the electrical grid 218 demands an amount of power within the peak range, the fuel cell controller 210 may adjust the operational parameters of the down-cycled fuel cell units to cause their power output to return to the limited maximum output over the predetermined period (e.g., 3 hours).

In some embodiments, the fuel cell controller 210 operates each of the sets of fuel cell units 204, 206, and 208 in accordance with a separate set of operating parameters. For example, in one embodiment, in response to an indication of a peak demand from the load sensor 220 (e.g., a measured current within a first predetermined range), the fuel cell controller 210 may operate each fuel cell unit in the first set of fuel cell units 204 at a first limited maximum power output (e.g., approximately 50% of a maximum rated power output), each fuel cell unit in the second set of fuel cell units 206 at a second limited maximum power output (e.g., approximately 60% of the maximum rated power output), and each fuel cell unit in the third set of fuel cell units 208 at a third limited maximum power output (e.g., approximately 65% of the maximum rated power output). Such a staggered approach can provide more flexibility in achieving the sometimes unpredictable ebbs and flows of the load of the bulk electric system.

For example, in response to receiving an indication a reduced power demand from the load sensor 220 (e.g., a reduced current drawn by the electrical grid 218, or a measured current within a second predetermined range that is lower than the first predetermined range), the fuel cell controller 210 may adjust the operating parameters of any one or combination of the sets of fuel cell units 204, 206, and 208 to reduce the overall electrical output of the fuel cell power plant 202. In an example, if the indication of the reduced power demand is a limited reduction in demand (e.g., a small percentage change such as 5% or 10% of the peak demand), the fuel cell controller 210 may solely reduce the power output of the first set of fuel cell units 204 to minimally impact the overall power output as a percentage.

In various embodiments, the fuel cell controller 210 (or the fuel cell controller 142 discussed with respect to FIG. 1) is configured to control the power production of each fuel unit as described in U.S. Pat. No. 7,800,340, hereby incorporated by reference in its entirety. For example, the fuel cell controller 210 may utilize a lookup table to convert a value returned by the load sensor 220 to a required DC output for the fuel cell power plant 202. Based on this required DC output, the fuel cell controller 210 determines a fuel utilization factor for each individual fuel cell unit by using an additional lookup table. The particular lookup table used to determine the fuel utilization factor may depend on a number of factors, such as the required DC output, the current operational mode of each individual fuel cell unit (e.g., whether fuel cell units are operating at the limited maximum power output or a minimum power output), and the composition of fuel being fed into the fuel cell power plant 202. Based on the fuel utilization factor, a fuel demand for each fuel cell unit is determined. In an example, if each of the fuel cell units of the fuel cell power plant 202 are operating at a limited maximum output, in response to receiving an indication of a local minimum electrical load, the fuel cell controller 210 determines that a minimum DC output is required and retrieves a lookup table associated with an operational state of the fuel cell power plant 202 where all the fuel cell units are operating at the limited maximum output. Using the lookup table, the fuel utilization factor and fuel demand for each fuel cell unit is determined, and control signals are provided to fuel flow control valves to generate the required DC output.

In some embodiments, the fuel cell controller 210 is configured to sequentially (as opposed to simultaneously) control the fuel cell units to achieve a desired fluctuation in output over time. For example, in one embodiment, the fuel cell controller 210 is configured to evenly distribute load cycling over all of the fuel cells in a given system. For example, if on a given day the fuel cell units of the first set of fuel cell units 204 are load cycled to account for a reduction in the load of the electrical grid 218, the fuel cell controller 210 may select to load cycle the second set of fuel cell units 206 on the following day. This can be repeated on a day-to-day basis such that none of the load cycling fuel cells are load cycled more than others.

In some embodiments, some of the fuel cell units in the fuel cell power plant 202 are operated at or close to the maximum rated power-output discussed above, while others are operated at a limited-maximum power output. The fuel cell units operated at the maximum rated power-output cannot be significantly load cycled without adverse impacts on the aging of the fuel cell units. Given this, the fuel cell units operated at a limited-maximum power output are reduced in output in response to reduced demands of the electrical grid 218. Table 1 is a chart that shows results of the fuel cell power plant 202 with various combinations of base loaded combined cycle fuel cell (CCFC) units (fuel cell units operating at or near the peak rated maximum output) and load cycling CCFC fuel cell units (fuel cell units operating at a limited maximum power output) in accordance with an illustrative embodiment.

TABLE 1

| CCFC Baseload # Units | CCFC Cycler # Units | Max. Site (MW) | Daily Turndown | Baseload Conversion Potential (MW) |
|---|---|---|---|---|
| 6 | 0 | 22.2 | 10% | N/A |
| 5 | 1 | 20.9 | 15% | 22.2 |
| 4 | 2 | 19.6 | 21% | 22.2 |
| 3 | 3 | 18.2 | 28% | 22.2 |
| 3 | 4 | 20.6 | 31% | 25.9 |
| 2 | 5 | 19.3 | 38% | 25.9 |
| 2 | 6 | 21.7 | 40% | 29.6 |
| 1 | 7 | 20.4 | 47% | 29.6 |
| 0 | 8 | 19.0 | 56% | 29.6 |

As shown Table 1, the fuel cell power plant 202 has a daily turndown capability of 10% when operating 6 base loaded fuel cells and zero load cycling fuel cells. The high efficiency fuel cell system also has a daily turndown capability of 56% when operating 8 load cycling fuel cells and zero base loaded fuel cells.

In some embodiments, such as where each fuel cell unit in the sets of fuel cell units 204, 206, and 208 includes a simple cycle fuel cell (SCFC), the power generation system 200 further includes an energy recovery unit 212. In various embodiments, the energy recovery unit 212 includes an Organic Rankine Cycle turbine configured to generate an additional AC power output using the waste heat (e.g., cathode exhaust from the fuel cell stacks of the fuel cell units) produced by the fuel cell power plant 202. In various embodiments, the fuel cell controller 210 may selectively decouple the energy recovery unit 212 from the fuel cell power plant 202 to further increase power variability of the power generation system 200. Alternatively, the power generation of the energy recovery unit 212 may be ramped down or up. Table 2 shows results of a fuel cell power plant 202 with various combinations of base loaded fuel cell units (i.e., fuel cell units operating at maximum rated output) and load cycling fuel cells (i.e., fuel cell units operating at a limited maximum output) for a ~20 MW power plant project in accordance with an illustrative embodiment. For scenarios in Table 2, the results are shown with and without use of an ORC turbine in the system. Table 2 also depicts the baseload conversion potential of the fuel cell power plant 202, which refers to a situation when all cycling fuel cell units are brought to the maximum rated operation mode.

TABLE 2

| SCFC Baseload # Units | SCFC Cycler # Units | ORC | Max. Site (MW) | Daily Turndown | Baseload Conversion Potential (MW) |
|---|---|---|---|---|---|
| 7 | 0 | 0 | 19.6 | 10% | N/A |
| 7 | 0 | 1 | 21.2 | 17% | N/A |
| 6 | 2 | 0 | 20.4 | 18% | 22.4 |
| 6 | 1 | 1 | 20.1 | 21% | 21.2 |
| 5 | 3 | 0 | 19.4 | 23% | 22.4 |
| 5 | 3 | 1 | 21.0 | 28% | 22.4 |
| 4 | 5 | 0 | 20.2 | 30% | 25.2 |
| 4 | 4 | 1 | 19.9 | 33% | 22.4 |
| 3 | 6 | 0 | 19.2 | 36% | 25.2 |
| 3 | 6 | 1 | 20.7 | 40% | 25.2 |
| 2 | 8 | 0 | 20.0 | 43% | 28 |
| 2 | 7 | 1 | 19.7 | 46% | 25.2 |
| 1 | 10 | 0 | 20.8 | 49% | 30.8 |
| 1 | 9 | 1 | 20.5 | 53% | 28 |
| 0 | 11 | 0 | 19.8 | 56% | 30.8 |
| 0 | 10 | 1 | 19.4 | 59% | 28 |

As shown in Table 2, a minimum daily turndown of 10% is achieved with the use of 7 base loaded fuel cell units and no load cycling fuel cell units, without use of an ORC turbine. This same scenario increases to a 17% turndown capability with the use of an ORC turbine. The maximum daily turndown depicted in Table 2 (59%) results from a system with zero base loaded fuel cell units, 10 load cycling fuel cell units, and use of an ORC turbine. Table 2 also indicates that a system with zero base loaded fuel cell units, 11 load cycling fuel cell units, and no use of an ORC turbine results in a maximum daily turndown of 56%. If at any point in the operation of the fuel cell units, the power demand changes so as to require a more firm generation, one or more of the fuel cell units can be converted from a load cycling plant to a baseload plant (e.g., by ramping up power production to the maximum-rated power output). Table 2 highlights the capability to add to the baseload generation.

Figure 3:
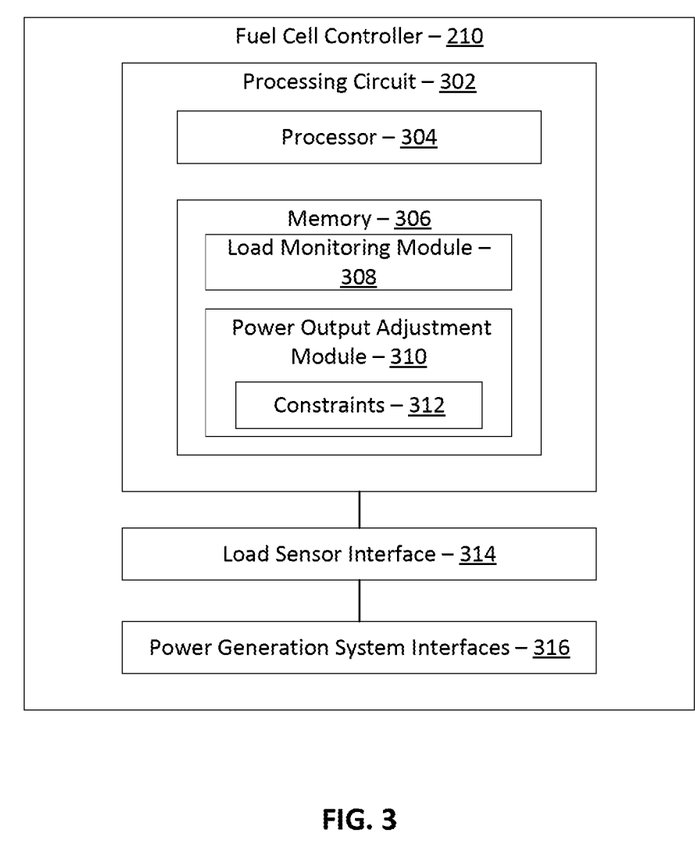
FIG. 3 is a schematic diagram of a fuel cell controller, according to an example embodiment.

Referring now to FIG. 3, a more detailed view of the fuel cell controller 210 of the power generation system 200 of FIG. 2 is shown, according to an example embodiment. The fuel cell controller 210 includes a processing circuit 302 including a processor 304 and a memory 306. Processor 304 may be a general purpose or specific purpose processor, an application specific integrated circuit (ASIC), one or more field programmable gate arrays (FPGAs), a group of processing components, or other suitable processing components. Processor 304 may be configured to execute computer code or instructions stored in memory 306 or received from other computer readable media (e.g., CDROM, network storage, a remote server, etc.) to perform one or more of the processes described herein. Memory 306 may include one or more data storage devices (e.g., memory units, memory devices, computer-readable storage media, etc.) configured to store data, computer code, executable instructions, or other forms of computer-readable information. Memory 306 may include random access memory (RAM), read-only memory (ROM), hard drive storage, temporary storage, non-volatile memory, flash memory, optical memory, or any other suitable memory for storing software objects and/or computer instructions. In some embodiments, the controller 210 also includes a user interface (not shown). The user interface may include a display or other element (e.g., a button, joystick, etc.) capable of receiving an operator input to adjust any of the operational parameters of any of the components of the power generation system 200.

As shown in FIG. 3, the memory 306 includes a load monitoring module 308 and a power output adjustment module 310. It should be understood that the memory 306 may include more, less, or different modules without departing from the scope of the present disclosure. The load monitoring module 308 is structured to cause the processor 304 to analyze data received regarding the power demands of an electrical load (e.g., the electrical grid 218) to which the power generation system 200 is providing a power output. In this regard, the load monitoring module 308 may be configured to analyze various inputs regarding the level of power demanded by the electrical load. In various embodiments, in response to the fuel cell controller 210 (e.g., via the load sensor interface 314 described below) receiving a sensor signal (e.g., indicative of a level of current demanded at a particular point on an electrical grid 218) from the load sensor 220, the load monitoring module 308 may causes the processor 304 to perform an analysis on the received signal.

In an example, the load monitoring module 308 may include various power adjustment triggers. If a sensor signal received from the load sensor 220 meets parameters defined by any of the power adjustment triggers, the processor 304 (e.g., via the power output adjustment module 310 described below), may adjust the operational parameters of the various fuel cell units in the fuel cell power plant 202 to adjust the overall power output of the power generation system 200 based on the demands of the electrical load. One such adjustment trigger may include a comparison of a signal from the load sensor 220 with previously measured values (e.g., if a power demand of the electrical load decreases by more than a predetermined percentage within a predetermined time period). Other adjustment triggers may be associated with various predetermined ranges of power demands and the current power output of the fuel cell power plant 202. For example, if a level of current demanded by the electrical load is within a predetermined peak range and if the fuel cell power plant 202 is not operating at a maximum level output (e.g., if at least one fuel cell unit is operating below the limited maximum level discussed above), the load monitoring module 308 may trigger the power output adjustment module 310 to upwardly adjust the level of power output of the fuel cell power plant 202. In another example, if a level of current demanded by the electrical load is within a predetermined minimal range and the fuel cell power plant is generating a positive power output (e.g., if at least one fuel cell unit is producing a nonzero power output) above what is demanded, the load monitoring module 308 trigger the power output adjustment module 310 to downwardly adjust the level of power output of the fuel cell power plant 202.

The power output adjustment module 310 is configured operate the fuel cell units of the fuel cell power plant 202 based on a power level demanded by the electrical load. In this regard, the power output adjustment module 310 is configured to provide control signals to various components (e.g., flow control valves, blowers, inverters, current regulators) of each fuel cell unit of the fuel cell power plant 202 to control the level of power output by each fuel cell unit as described in U.S. Pat. No. 7,800,340. As discussed above, in response to receiving an indication of a peak-level power demand from the electrical load, the power output adjustment module 310 may cause the processor 304 to provide control signals (e.g., via the power generation system interfaces 316 described below) to provide a maximum level power output (e.g., operate each fuel cell unit in the fuel cell power plant 202 at a limited maximum power output, or operate a first set of fuel cell units at a limited maximum power output and a second set of fuel cell units at a maximum rated power output).

In response to the fuel cell controller 210 detecting (e.g., via the load monitoring module 308) of a decrease in power demanded by the electrical load, however, the power output adjustment module 310 may cause the processor 304 to adjust the operational parameters of at least some of the fuel cell units of the fuel cell power plant 202. For example, the fuel cell controller 210 may control the flow rates (e.g., via adjusting the positioning of valves similar to the valves 124 and 126 discussed with respect to FIG. 1) of air, water, and fuel into a fuel cell unit to reduce the power output of the fuel cell unit (e.g., to a level below the limited maximum power output). Additionally, the fuel cell controller 210 may control the setpoint of the inverter 234 to reduce the power output of the fuel cell power plant 202. In response to the fuel cell controller 210 detecting a heightened level of power demanded by the electrical load, the power output adjustment module 310 may cause the fuel cell controller 210 to adjust the flow rates (e.g., via adjusting the positioning of valves similar to the valves 124 and 126 discussed with respect to FIG. 1) of water and fuel into a fuel cell unit back upwards to return power output to a heightened level.

In various embodiments, the adjustment of the operational parameters of the fuel cell units is subject to various constraints 312. For example, in one embodiment, the adjustment of one operational parameter (e.g., rate of fuel introduction into a fuel cell unit) may not be adjusted by more than a predetermined amount or percentage within a predetermined period to prevent damaging various fuel cell components. Other constraints may relate to the identity of the fuel cell unit to be adjusted. For example, in some embodiments, fuel cell units may not be down-cycled (e.g., to a power output below the limited maximum power output) more than a predetermined number of times (e.g., 1) in a predetermined period (e.g., daily). As such, the power output adjustment module 310 may cause the processor 304 to access a data log identifying the operational parameters of the fuel cell units at various times. If the data log reveals that a first fuel cell unit was down-cycled within a predetermined period but a second fuel cell unit was not, then the operational parameters of the second fuel cell unit may be adjusted to down-cycle the second fuel cell unit.

As shown in FIG. 3, the fuel cell controller 210 further includes a load sensor interface 314. The load sensor interface 314 is configured to receive signals from the load sensor 220. In some embodiments, the load sensor 220 is coupled to the fuel cell controller 210 via a wired connection. As such, the load sensor interface 314 may include a jack, solder point, or any other hardware for physically coupling the fuel cell controller 210 with the load sensor 220. Additionally, load sensor interface 436 may include communications hardware/software, a digital to analog converter, an analog to digital converter, a circuit for interpreting signals representing power demands of the electrical load, and other suitable components.

In some embodiments, the load sensor interface 314 includes a wireless communications transceiver configured to communicate with the load sensor 220 via a wireless communications protocol (e.g., Wi-Fi®, or Bluetooth®). In an example, the load sensor 220 may be associated with the operator of the electrical grid 218, and the operator may wirelessly transmit usage data (e.g., actual power usage data, usage forecasts, etc.) to the fuel cell controller 210. As such, the fuel cell controller 210 may pre-emptively change the power production level of the fuel cell power plant 202 based on forecasted power needs.

The fuel cell controller 210 further includes power generation system interfaces 316. Power generation system interfaces 316 are configured to provide control signals to various components (e.g., components of fuel cell units, the energy recovery unit 212) of the power generation system 200 to control the level of power production. As such, power generation system interfaces 316 may include jacks, solder points, or any other hardware for physically coupling the fuel cell controller 210 with the various components described herein. Additionally, power generation system interfaces 316 may include communications hardware/software, a digital to analog converter, an analog to digital converter, and a circuit for interpreting signals representing power production levels of each individual fuel cell unit of the fuel cell power plant 202, and other suitable components.

Figure 4:
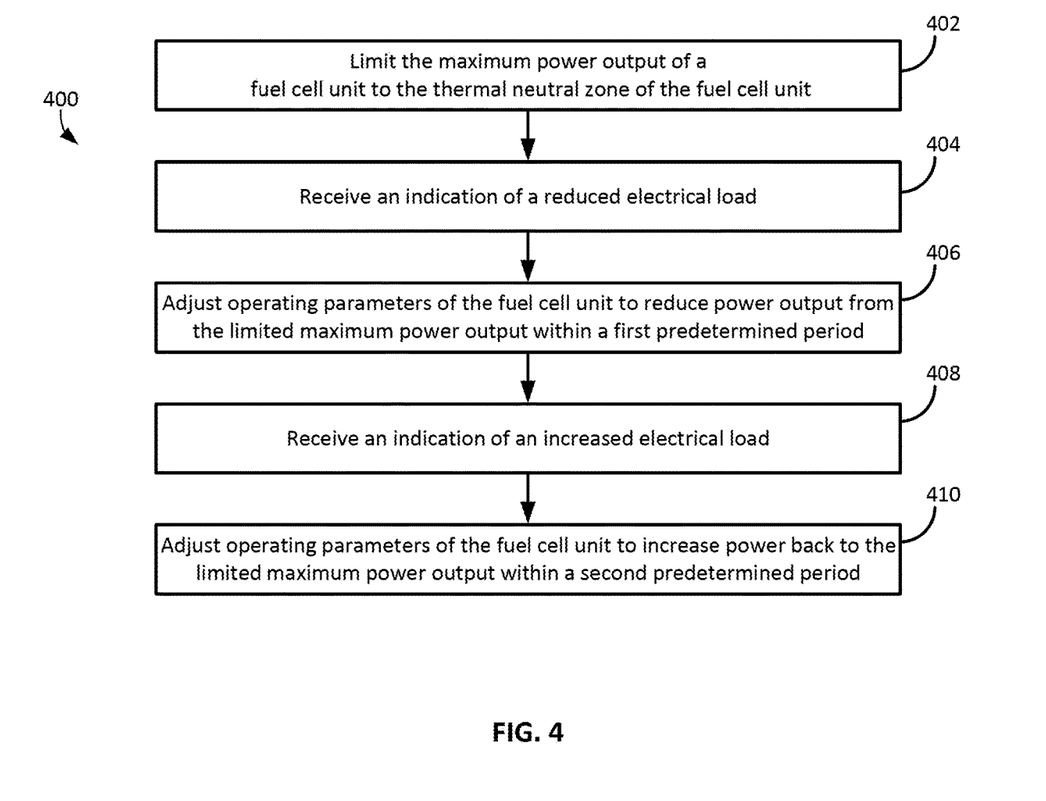
FIG. 4 is a flow diagram of a method of load cycling a fuel cell unit, according to an example embodiment.

Referring now to FIG. 4, a flow chart of a process 400 for operating a load-following fuel cell unit (e.g., the load-following fuel cell unit 100 discussed herein) based on an electrical load is shown, according to an example embodiment. Process 400 may be executed by, for example, the fuel cell controller 142 discussed above. Alternatively, in some embodiments, process 400 may be executed by the fuel cell controller 210 discussed above. In such embodiments, process 400 may be applicable to each of the plurality of fuel cell units included in the fuel cell power plant 202. Process 400 may be executed to provide a variable amount of electrical power with minimal impact on the aging of the fuel cell unit.

Process 400 includes limiting the maximum power output of a fuel cell unit to the thermal neutral zone of the fuel cell unit (block 402). For example, the fuel cell controller 142 may receive an indication that the electrical load 144 is at a local maximum value (e.g., the electrical load 144 may be drawing a current that is within a peak daily range). In response, the fuel cell controller 142 may operate various components of the fuel cell unit 100 (e.g., valves 124, 126, and 134, booster blowers 130 and 140, etc.) in accordance with a set of operational parameters (e.g., defining a flow rate of fuel from the fuel supply 118, water from the water supply 122, fuel from the supplemental fuel supply 132, a pressure differential between the topping module 102 and the bottoming module 110) such that the fuel cell unit 100 provides a limited maximum power output. The limited maximum power output may be a predetermined percentage (e.g., 50%-65%) of a maximum rated power output for the fuel cell unit 100.

Process 400 includes receiving an indication of a reduced electrical load (block 404). For example, in arrangements where the electrical load 144 includes an electrical grid, various customers that are supplied power via the electrical grid may reduce power consumption (e.g., during midday) resulting in a reduced current (e.g., below the peak daily range) being drawn by the electrical load 144. As will be appreciated, the amount in reduction of the electrical load may vary depending on the circumstance.

Process 400 includes adjusting the operating parameters of the fuel cell unit to reduce power output from the limited maximum power output within a first predetermined period (block 406). For example, in response to the indication of the reduced electrical load, the fuel cell controller 142 may reduce the flow rate of fuel from the fuel supply 118 provided to the anodes 106 of the fuel cell stacks 104 of the topping module 102 to reduce the power output of the load-following fuel cell unit 100 to a first minimum value below the limited maximum value over a first predetermined period (e.g., 1-3 hours). In various embodiments, the first minimum value is at most 40% of the maximum rated power output of the load-following fuel cell unit 100.

In some embodiments, additional indications of a reduced electrical load may be received. For example, customers of an electrical grid may further reduce power consumption below the level indicated at 404. In response to such an indication, the fuel cell controller 142 may adjust operating parameters of the fuel cell unit to reduce power output from the first minimum vale to a second minimum value (e.g., 0%, 5%, 10%, 20%) that is lower than the first minimum value over a second predetermined period (e.g., 1 hour).

Process 400 includes receiving an indication of an increased electrical load. For example, customers of an electrical grid may increase power consumption above the level indicated at 404 (e.g., towards early-evening, the current drawn by the electrical load 144 may increase to a value within the peak daily range). In response, the fuel cell controller 142 may adjust the operational parameters of the load-following fuel cell unit 100 to increase power output back to the limited maximum value (block 410) within a third predetermined period (e.g., 1-3 hours). For example, the amount of fuel supplied to the anodes 106 may be increased at a predetermined rate to increase power production by the load-following fuel cell unit 100.

Figure 5:
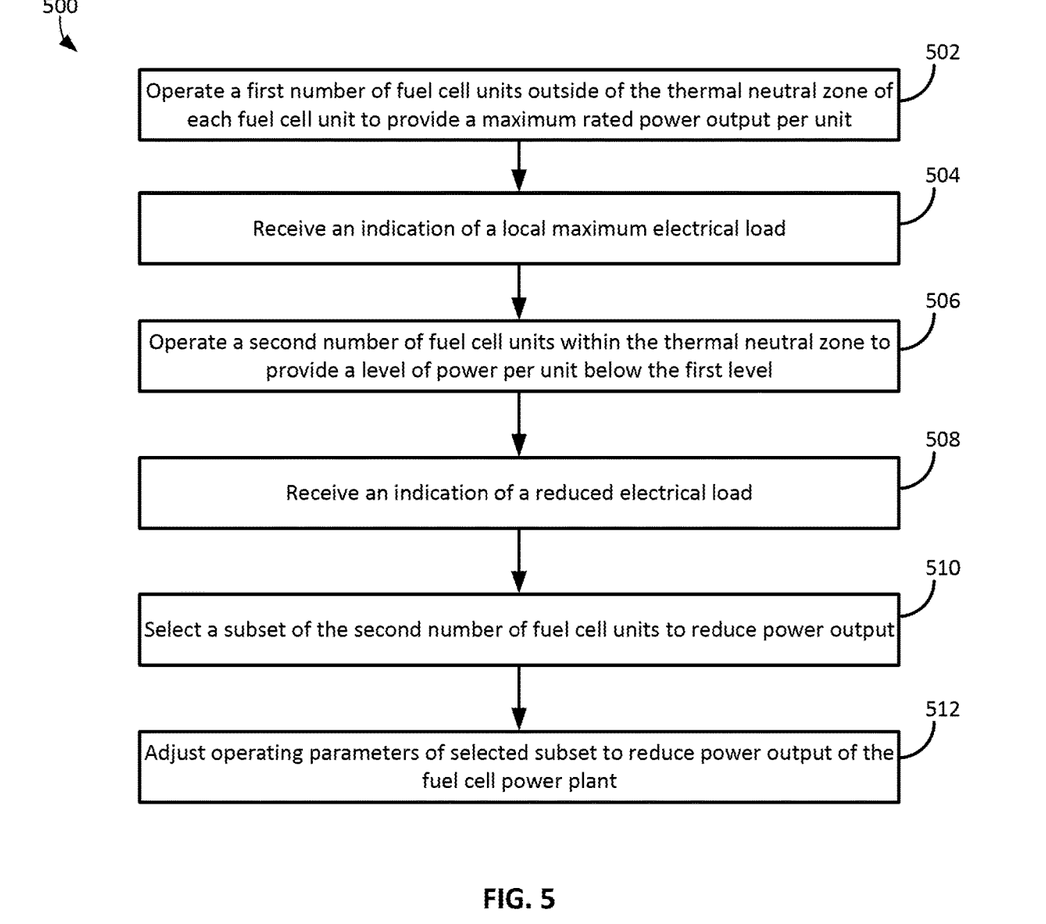
FIG. 5 is a method of operating a power generation system in accordance with the demands of an electrical load, according to an example embodiment.

Referring now to FIG. 5, a flow chart of a process 500 for operating a fuel cell power plant (e.g., the fuel cell power plant 202 discussed above) based on an electrical load is shown, according to an example embodiment. Process 510 may be executed by the fuel cell controller 210 discussed above. Process 500 may be executed to provide a variable amount of electrical power with minimal impact on the aging of the fuel cell power plant 202.

Process 500 includes operating a first number of fuel cell units (e.g., the first set of fuel cell units 204) outside of the thermal neutral zone of each fuel cell unit to provide a maximum rated power output per unit (block 502). For example, as a default, the fuel cell controller 210 may operate each of the fuel cell units of the first set of fuel cell units 204 in accordance with a first set of operating parameters to produce a power output at the maximum rated power output (e.g., 3.7 MW). In various embodiments, to prevent aging effects on the first set of fuel cell units 204, the fuel cell controller 210 may maintain the operational parameters for these fuel cell units at the default levels. In some embodiments, the fuel cell controller may vary the operational parameters of the first set of fuel cell units 204 to vary the power output of each of the fuel cell units in the first set of fuel cell units 204 by as much as 10% of the maximum rated power output. Such limited cycling increases the overall cycling ability of the fuel cell power plant 202.

Process 500 includes receiving an indication of a local maximum electrical load. For example, customers of the electrical grid 218 may demand a relatively high amount of electrical power (e.g., in the early evening), causing the load sensor 220 to detect a current within a peak daily range. In some embodiments, the indication may be received from an external computing system. For example, an authority associated with the electrical grid 218 may provide a forecast of the electrical load to the fuel cell controller 210. Such a forecast may be stored in the memory 306 of the controller, and the fuel cell controller 210 may periodically retrieve a power demand forecast value. Any entity capable of monitoring the power demands of the electrical grid 218 may provide such an indication.

Process 500 includes, in response to the indication received at 504, operating a second number of fuel cell units (e.g., the second set of fuel cell units 206) within the thermal neutral zone of each fuel cell unit (block 506). As such, each fuel cell unit in the second set of fuel cell units 206 produces a limited maximum power output that is a predetermined percentage (e.g., 50%-65%) of the maximum rated power output for each fuel cell unit. To produce such a limited maximum power output, various approaches may be taken. For example, in one embodiment, each fuel cell unit in the second set of fuel cell units 206 may be operated at a second set of operational parameters such that each fuel cell unit produces a power output at the same limited maximum value. Alternatively, subsets of the second set of fuel cell units 206 may be operated at different sets of operational parameters such that the fuel cell units in the different subsets produce a power output at different limited maximum value. In an example, a first subset of the second set of fuel cell units 206 produces a power output at a first limited maximum value (e.g., 50% of the maximum rated power output), while a second subset of the second set of fuel cell units 206 produces a power output at a second limited maximum value (e.g., 60% of the maximum rated power output).

Process 500 includes receiving an indication of a reduced electrical load (block 508). For example, customers of the electrical grid 218 may reduce power consumption, causing the load sensor 220 to detect a current level below the peak-daily range. In response, the fuel cell controller 210 selects a subset of the second set of fuel cell units 206 (block 510). In various embodiments, the selection may be based on a down-cycling history of the fuel cell power plant 202. For example, the fuel cell controller 210 may maintain a log describing the operational parameters used to operate various fuel cell units at various times. As such, the log describes which fuel cell units were cycled at various times. In some embodiments, various selection rules are used to select the subset of fuel cell units. In one example, fuel cell units that have been down cycled below their limited maximum output within a predetermined period (e.g., a day) are not selected.

In some embodiments, the fuel cell units are selected based on the indication received at 508. For example, different subsets of the second set of fuel cell units 206 may be selected depending on the level of the electrical load sensed by the load sensor 220. If the reduction in electrical load is a limited departure (e.g., 10%) from the local maximum, for example, a subset of fuel cell units operating at a higher limited maximum output may be selected to reduce the overall power output of the fuel cell power plant by less as a percentage.

Process 500 includes adjusting the operational parameters of the selected subset of fuel cell units to reduce the power output of the fuel cell power plant. For example, for a selected fuel cell unit of the second set of fuel cell units 206, the fuel cell controller 210 may close the valves 124 and 126 to reduce the rates at which fuel and water are supplied to a topping module 102 and thereby reduce the power production of the fuel cell unit to a minimum value over a predetermined period (e.g., 1-3 hours). If another indication of a local maximum electrical load is received, the fuel cell controller 210 may gradually re-open the valves 124 and 126 to ramp power production of the selected fuel cell unit back up to the limited maximum value. Alternatively, if another indication of a reduced electrical load is received, the fuel cell controller 210 may repeat 510 and 512 to select an additional fuel cell unit in the second set of fuel cell units 206 and adjust the operating parameters to reduce the power output of the additional fuel cell unit to another minimum value.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A fuel cell system comprising:
 a fuel cell unit configured to generate an amount of electrical power for supply to a varying electrical load, the amount of electrical power varying as a function of an operational parameter of the fuel cell unit, wherein the fuel cell unit comprises a fuel cell stack;
 a fuel cell controller communicatively coupled to the fuel cell unit, the fuel cell controller configured to:
 receive a first indication, from a load sensor in communication with the fuel cell controller and operatively coupled to the varying electrical load, that the varying electrical load is at a local maximum within a predetermined period;
 in response to receiving the first indication, operate the fuel cell stack with the operational parameter having a first value such that the fuel cell stack produces a limited maximum amount of electrical power that is a predetermined percentage of a maximum rated power output of the fuel cell stack;
 receive a second indication from the load sensor that the varying electrical load has reduced from the local maximum; and
 in response to receiving the second indication that the varying electrical load has reduced from the local maximum, operate the fuel cell stack with the operational parameter having a second value, the second value being constrained such that the fuel cell stack continues to operate and produce electrical power at an amount above a minimum value and below the limited maximum amount of electrical power; wherein the limited maximum amount of electrical power is determined by the thermo-neutral load point of the fuel cell unit.

2. The fuel cell system of claim 1, wherein the predetermined percentage of the maximum rated power output is between approximately 50% and approximately 65%.

3. The fuel cell system of claim 2, wherein the predetermined percentage of the maximum rated power output is approximately 65%.

4. The fuel cell system of claim 1, wherein the load sensor is configured to generate a signal based on electrical power demand level of the electrical load, wherein the first and second indications include signals generated by the load sensor.

5. The fuel cell system of claim 1, wherein the electrical load is an electrical grid.

6. The fuel cell system of claim 1, wherein the fuel cell system comprises a plurality of fuel cell units configured to generate a total amount of electrical power for supply to the varying electrical load, the total amount of electrical power varying as a function of an operational parameter of the plurality of fuel cell units, and wherein the electrical output of each fuel cell unit of the plurality of fuel cell units is combined to supply electrical power to the varying electrical load, wherein each of the plurality of fuel cell units is capable of producing a power output at the maximum rated power output.

7. The fuel cell system of claim 6, wherein the fuel cell controller is configured to, in response to receiving the first indication, operate the plurality of fuel cell units with the operational parameter of the plurality of fuel cell units having a first set of values such that each fuel cell unit of a subset of the plurality of fuel cell units produces a limited maximum amount of electrical power, the limited maximum amounts of electrical power being a predetermined percentage of the maximum rated power output of the respective fuel cell unit.

8. The fuel cell system of claim 7, wherein the fuel cell controller is configured to:
in response to receiving the indication that the varying electrical load has reduced from the local maximum, select a fuel cell unit of the subset of fuel cell units; and
adjust the value of the operational parameter of the selected fuel cell unit over a predetermined period such that the power output of the selected fuel cell unit drops to a minimum value over a first predetermined period.

9. The fuel cell system of claim 8, wherein the minimum value is at most 40% of the maximum rated power output.

10. The fuel cell system of claim 8, wherein the first predetermined period is between approximately 1 and approximately 3 hours.

11. The fuel cell system of claim 1 wherein the fuel cell controller is further configured to:
receive a third indication that the varying electrical load is at the local maximum; and
adjust the value of the operational parameter of the fuel cell unit over a predetermined period such that the power output of the fuel cell stack returns to the limited maximum value over a second predetermined period.

12. The fuel cell system of claim 1, wherein the fuel cell stack comprises a molten carbonate fuel cell including an anode configured to receive a reactant fuel originating from a fuel supply and a cathode configured to receive an oxidant gas, and wherein the operational parameter defines at least one of a flow rate of fuel from the fuel supply, or a flow rate of oxidant gas from the oxidizer.

13. The fuel cell system of claim 1, wherein the predetermined percentage of a maximum rated power output of the fuel cell stack is based on a thermal-neutral zone associated with the fuel cell stack.

14. The fuel cell system of claim 1, wherein at least one of the first value and the second value is based on a fuel utilization factor.

15. The fuel cell system of claim 1, wherein the fuel cell unit is one of a plurality of fuel cell units, wherein the fuel cell controller is configured to operate a first subset of the plurality of fuel cell units responsive to the first indication and second indication based on a cycling log of the plurality of fuel cell units.

16. The fuel cell system of claim 1, wherein the fuel cell system comprises a first plurality of fuel cell units and a second plurality of fuel cell units, wherein each fuel cell unit of the first and second pluralities of fuel cell units is configured to generate a respective amount of electrical power for supply to the varying electrical load, wherein the electrical output of each fuel cell unit of the first and second pluralities of fuel cell units is combined to supply electrical power to the varying electrical load, and
wherein operating the fuel cell stack with the operational parameter having the first value in response to receiving the first indication comprises operating each fuel cell unit of the second plurality of fuel cell units at a limited maximum power output that is the predetermined percentage of the maximum rated power output of the respective fuel cell unit while operating each fuel cell unit of the first plurality of fuel cell units at a different power output from the limited maximum power output.

17. A fuel cell system comprising:
a first plurality of fuel cell units configured to provide electrical power to a varying electrical load, the amount of electrical power varying as a function of an operational parameter of the first plurality of fuel cell units, wherein each of the first plurality of fuel cell units includes a fuel cell stack;
a second plurality of fuel cell units configured to provide electrical power to the varying electrical load, the amount of electrical power varying as a function of an operational parameter of the second plurality of fuel cell units, wherein each of the second plurality of fuel cell units includes a fuel cell stack, and wherein each fuel cell stack in the first plurality of fuel cell units and the second plurality of fuel cell units has a maximum rated power output; and
a fuel cell controller communicatively coupled to the first plurality of fuel cell units and the second plurality of fuel cell units, the fuel cell controller configured to:
operate each fuel cell stack of the first plurality of fuel cell units with the operational parameter having a first value as a default such that each fuel cell stack in the first plurality of fuel cell units produces the respective maximum rated power output in a default operating condition; and
receive an indication, from a load sensor in communication with the fuel cell controller and operatively coupled to the varying electrical load, that the varying electrical load is at a local maximum within a predetermined period;
in response to the indication that the varying electrical load is at the local maximum, operate each of the fuel cell stacks in the second plurality of fuel cell units with the operational parameter having values such that the fuel cell stacks of the second plurality of fuel cell units produce limited maximum amounts of electrical power that are cell units each produce a limited maximum amount of electrical power that is a predetermined percentage of the respective maximum rated power output;

receive a first indication, from the load sensor, that the varying electrical load has reduced from the local maximum; and in response to receiving the first indication that the varying electrical load has reduced from the local maximum, adjust the operational parameter for a fuel cell stack in the second plurality of fuel cell units such that the fuel cell stack continues to produce electrical power at an amount above a minimum value and below the limited maximum amount of electrical power; wherein each limited maximum amount of electrical power is determined by the thermo-neutral load point of the respective fuel cell stack.

18. The fuel cell system of claim 17, wherein each predetermined percentage of the maximum rated power output is between approximately 50% and approximately 65%.

19. The fuel cell system of claim 17, wherein the fuel cell controller is further configured to, in response to receiving the indication that the varying electrical load is at the local maximum, operate each of the fuel cell stacks in the second plurality of fuel cell units with the operational parameter having an equivalent value such that each fuel cell stack of the second plurality of fuel cell units produces a power output at the same limited maximum value.

20. The fuel cell system of claim 17, wherein the fuel cell controller is configured to:

in response to receiving the indication that the varying electrical load is at the local maximum:

operate a first subset of the second plurality fuel cell units with the operational parameter having a second value such that each fuel cell stack in the first subset produces a power output at a first limited maximum value; and operate a second subset of the second plurality fuel cell units with the operational parameter having a third value such that each fuel cell stack in the second subset produces a power output at a second limited maximum value.

21. The fuel cell system of claim 20, wherein the fuel cell controller is further configured to, in response to receiving the first indication that the varying electrical load has reduced from the local maximum, operate the first subset with the operational parameter having a fourth value such that each fuel cell stack in the first subset produces a first minimum amount of electrical power, while maintaining operation of the second subset with the operational parameter having the second value.

22. The fuel cell system of claim 21, wherein the fuel cell controller is further configured to:

receive a second indication that the varying electrical load has reduced from the local maximum; and in response to receiving the second indication, operate the second subset with the operational parameter having a fifth value such that each fuel cell stack in the second subset produces a second minimum amount of electrical power, while maintaining operation of the first subset with the operational parameter having the second value.

23. The fuel cell system of claim 17, wherein each fuel cell stack in the first and second plurality of fuel cell units comprises an anode configured to receive a reactant fuel originating from a fuel supply and a cathode configured to receive an oxidant gas from an oxidizer, wherein the operational parameter defines at least one of a flow rate of reactant fuel from the fuel supply or a flow rate of oxidant gas from the oxidizer.

* * * * *